US008837425B2

United States Patent
Williams (10) Patent No.: US 8,837,425 B2
(45) Date of Patent: Sep. 16, 2014

(54) NETWORK STATION IDENTIFIERS IN A WIRELESS COMMUNICATION SYSTEM

(75) Inventor: Christopher Williams, Trowbridge (GB)

(73) Assignee: Fujitsu Limited, Kawasaki (JP)

( * ) Notice: Subject to any disclaimer, the term of this patent is extended or adjusted under 35 U.S.C. 154(b) by 831 days.

(21) Appl. No.: 12/564,027

(22) Filed: Sep. 21, 2009

(65) Prior Publication Data

US 2010/0085945 A1 Apr. 8, 2010

(30) Foreign Application Priority Data

Oct. 8, 2008 (EP) .................................... 08166158

(51) Int. Cl.
*H04W 4/00* (2009.01)
*H04W 48/16* (2009.01)
*H04L 5/00* (2006.01)
*H04L 29/06* (2006.01)
*H04W 84/02* (2009.01)
*H04W 48/08* (2009.01)

(52) U.S. Cl.
CPC ............. *H04L 5/0053* (2013.01); *H04L 5/0037* (2013.01); *H04L 63/101* (2013.01); *H04W 48/16* (2013.01); *H04L 5/0007* (2013.01); *H04W 84/02* (2013.01); *H04W 48/08* (2013.01)
USPC ........... 370/331; 370/328; 370/329; 370/338; 455/435.1; 455/436; 455/456.1

(58) Field of Classification Search
None
See application file for complete search history.

(56) References Cited

U.S. PATENT DOCUMENTS

| 6,728,539 | B2* | 4/2004 | Kuwahara ................. 455/435.1 |
| 7,069,040 | B2* | 6/2006 | Iwanaga et al. ............... 455/525 |
| 2003/0092443 | A1* | 5/2003 | Hiyama et al. ............... 455/435 |
| 2008/0112356 | A1* | 5/2008 | Jung et al. ..................... 370/328 |
| 2009/0094680 | A1* | 4/2009 | Gupta et al. ........................ 726/3 |
| 2010/0008282 | A1* | 1/2010 | Bhattad et al. ................ 370/312 |

FOREIGN PATENT DOCUMENTS

| EP | 1890447 | 2/2008 |
| EP | 1962535 | 8/2008 |
| EP | 2053879 | 4/2009 |
| GB | 2446192 | 8/2008 |
| WO | 00/64207 | 10/2000 |
| WO | 2009/009353 | 1/2009 |

OTHER PUBLICATIONS

U.S. Appl. No. 61/080,025, filed Jul. 2008, Bhattad et al.*

(Continued)

*Primary Examiner* — Warner Wong
*Assistant Examiner* — Brian T Le
(74) *Attorney, Agent, or Firm* — Myers Wolin, LLC (57) ABSTRACT

A wireless communication system allowing transmission of identifiers of network stations, the system including: a first network station, such as a femto cell basestation, with an identifier and a first transmission coverage area; a second network station, such as a macro cell basestation, with an identifier and a second transmission coverage area, which is larger than and overlaps with the first transmission coverage area; and storage means storing a unit of time defined in the system, along with a first ID window defined within the unit of time allocated to the first network station for transmission of its own identifier and a subsequent second ID window defined within the unit of time allocated for transmission of the second network station identifier.

17 Claims, 6 Drawing Sheets

(56) References Cited

OTHER PUBLICATIONS

European Search Report for the corresponding European Patent Application No. 08166158.9, dated Jul. 6, 2009.
IEEE Computer Society and IEEE Microwave Theory and Techniques Society; IEEE Std 802.16-2004 (Revision of IEEE Std 802. 16-2001); IEEE Standard for Local and metropolitan area networks; "Part 16: Air Interface for Fixed Broadband Wireless Access Systems"; dated Oct. 1, 2004; [Ref.: European Search Report dated Jul. 6, 2009].
IEEE Computer Society and the IEEE Microwave Theory and Techniques Society; IEEE Std 802.16e-2005 and IEEE Std 802.16-2004/ Cor1-2005 (Amendment and Corrigendum to IEEE Std 802.16-2004); IEEE Standard for Local and metropolitan area networks; "Part 16: Air Interface for Fixed and Mobile Broadband Wireless Access Systems"; Amendment 2: Physical and Medium Access Control Layers for Combined Fixed and Mobile Operation in Licensed Bands and Corrigendum 1; dated Feb. 28, 2006; [Ref.: European Search Report dated Jul. 6, 2009].
Institute of Electrical and Electronic Engineers, Inc., Approved by IEEE Project 802 Mobile Broadband Wirless Access Group 802.20; "Operating Rules Working Group 802.20 The Mobile Broadband Wireless Access Group" Version 0.1; Draft: IEEE 802.20 PD-01v0.1; Dated Feb. 2003. [Ref.: European Search Report dated Jul. 6, 2009] URL: www.ieee802.org/20.
Mitsura Murata, et al.; "Enancing the Performance of Mobile Communications Systems"; NTT Mobile Communications Network Inc., Tokyo, Japan. IEEE International Conference on Universal Personal Communications, Oct. 12, 1993; pp. 732-736; [Ref.: European Search Report dated Jul. 6, 2009].
Manfred Lutterbach; "Extraction of RNC-ID of Macro Neighbor Cell from Cell-ID by Femto Access Point"; Siemens AG, Juergen Carstens; IP.Com Journal; dated Feb. 14, 2008; [Ref.: European Search Report dated Jul. 6, 2009].
Kwang Soon Kim, et al.; "Synchronization and Cell-Search Technique Using Preamble for OFDM Cellular Systems"; IEEE transaction on Vehicular Technology; vol. 56, No. 6; Nov. 2007; pp. 3469-3485.
Office Action issued for corresponding Japanese Patent Application No. 2009-232630, mailed Feb. 12, 2013 with English translation.
Li et al.; "Proposed SDD Text for Synchronization Channel in Section 11.7.2.1"; IEEE 802.16 Broadband Wireless Access Working Group <http://ieee802.org/16>, IEEE C802.16m-08/1092r1.; Sep. 17, 2008.

* cited by examiner

NETWORK STATION IDENTIFIERS IN A WIRELESS COMMUNICATION SYSTEM

CROSS REFERENCE TO RELATED APPLICATIONS

This application claims priority to European Patent Application No. 08166158.9 filed on Oct. 8, 2008, the disclosure of which is expressly incorporated herein by reference in its entirety.

TECHNICAL FIELD

The present invention relates to wireless communication systems of the type in which a network station communicates with multiple fixed or mobile subscriber stations. The network station is a node which is connected to the core, or backbone, of a network via the backhaul portion. Such network stations include base stations (referred to herein as macro basestations in order to distinguish from other basestation classes), pico basestations serving pico cells, femto basestations serving femto cells and relay stations. The subscriber station or user station is connected to the network stations via wireless links only.

BACKGROUND ART

Recently, various standards have been developed for data communication over broadband wireless links. These include the standard set out in IEEE 802.16 specification, commonly known as WiMAX, LTE and LTE-Advanced. IEEE 802.20 is another such system. These all use OFDM (Orthogonal Frequency Division Multiplexing) technology, with which the skilled reader will be familiar.

In systems of the above type, data is communicated by exchange of packets between the mobile stations and network station whilst a connection (management connection or transport connection), having a connection ID, is maintained between them. The direction of transmission of packets from the subscriber station to the network station is the uplink (UL), and the direction from the network station to the subscriber station is the downlink (DL).

Transmission of data packets takes place within "frames" which are the predetermined unit of time in the system, each frame conventionally having one downlink subframe followed by one uplink subframe, these in turn being divided in the time and frequency domain into a number of slots, and when utilising multiple transmit antennas possibly also divided spatially into a number of streams.

At the physical layer level, transmission of data involves combining groups of subcarriers (available frequencies in the system) to form "symbols" by employing the well-known technique of OFDMA (Orthogonal Frequency Division Multiple Access). The base station can apply different modulation and coding schemes (MCS) within distinct zones of a subframe, for example to provide high data throughput to nearby users, whilst providing a more robust signal to more distant users or users moving with high mobility.

In order to enable bi-directional communication between two nodes, two well known different approaches exist for duplexing the two (forward or downlink and reverse or uplink) communication links to overcome the physical limitation that a device cannot simultaneously transmit and receive on the same resource medium. The first, frequency division duplexing (FDD), involves operating the two links simultaneously but on different frequency bands by subdividing the transmission medium into two distinct bands, one for forward link and the other for reverse link communications. The second, time division duplexing (TDD), involves operating the two links on the same frequency band, but subdividing the access to the medium in time so that only the forward or the reverse link will be utilizing the medium at any one point in time. Both approaches (TDD & FDD) have their relative merits and are well used techniques for single hop wired and wireless communication systems. For example the IEEE802.16 standard incorporates both an FDD and TDD mode.

Figure 1:
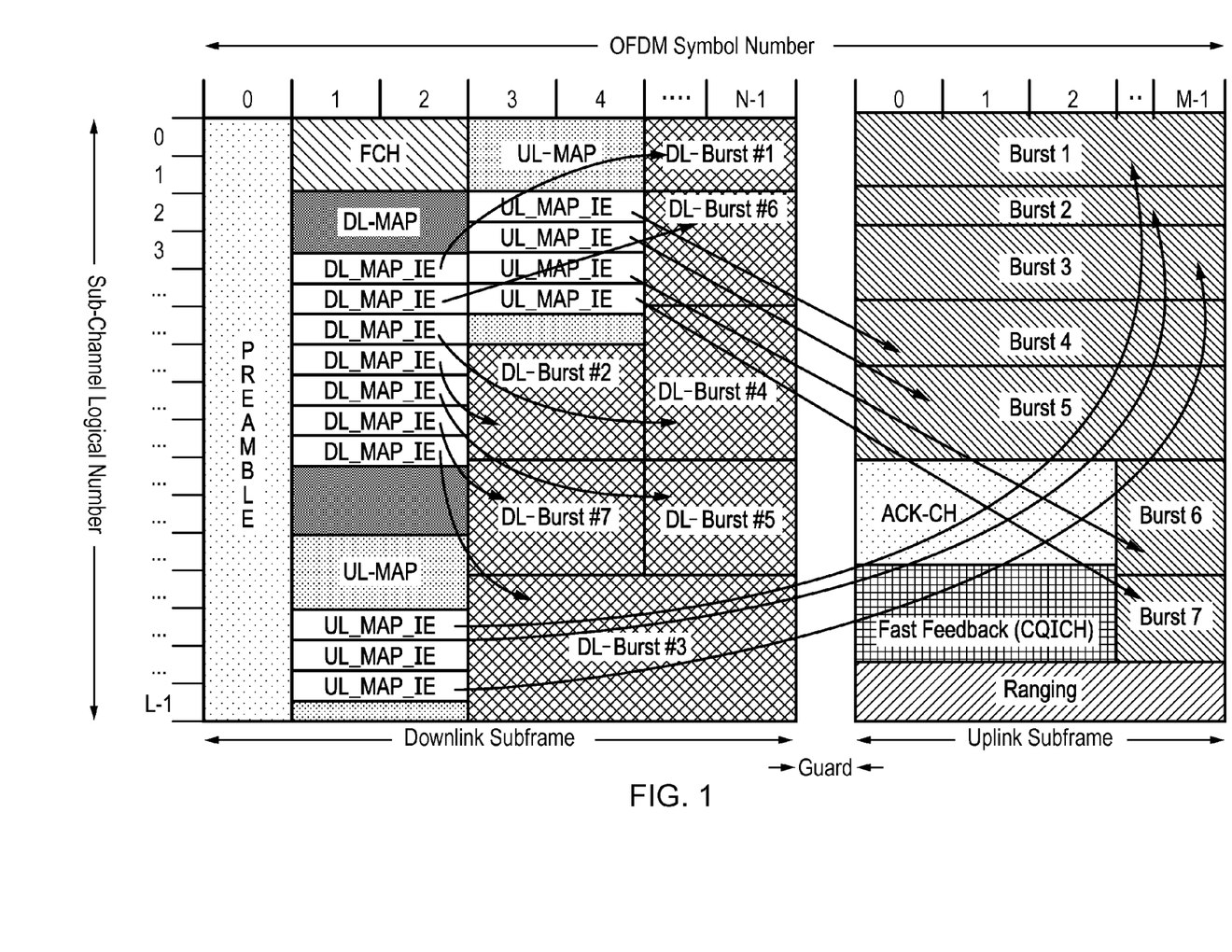
FIG. 1 shows a TDD frame structure in a known IEEE802.16e wireless communication system.

As an example, FIG. 1 illustrates the TDD frame structure used in the OFDMA physical layer mode of the IEEE802.16 standard (WiMAX). Each frame is divided into DL and UL subframes, each being a discrete transmission interval. They are separated by Transmit/Receive and Receive/Transmit Transition Guard interval (TTG and RTG respectively). Each DL subframe starts with a broadcast control field including a preamble followed by the Frame Control Header (FCH), the DL-MAP, and the UL-MAP, by which the network station informs the subscriber station of the allocating within the DL and UL. The frame is basically a format of time (and available transmission frequency) and is subdivided in time and/or frequency to allocate resources. The smallest allocation (subdivision) possible is known as a "slot". A part of the frame which is allocated for transmission to one or more stations is referred to herein generally as a "window", which can occupy all the available bandwidth or part thereof and which occupies a single time interval in a frame. A window can therefore take up one or more slots.

In cellular communication systems each network station (also referred as base station herein, but including relay stations) requires a distinct identifier (or Cell ID) to be transmitted, which is commonly signaled as part of the preamble symbols. The Cell ID is commonly one of a set of sequences with properties suitable for distinguishing the network station from those around it. Also, each sequence should ideally have:

Good auto-correlation properties: To enable the determination of time/frequency offsets induced in the transmission process;

Low correlation with the other sequences: To enable different sequences to be used to identify different transmitters (i.e. provide an identification parameter that can be further used in the receiver);

Good cross-correlation properties: To prevent false detection of time/frequency offsets;

Low peak to average power ratio (PAPR) in the time domain: Enables the use of non-linear amplifiers or transmit power boosting above the standard data transmission power due to the different in PAPR between the preamble symbols and the data signal; and Near-constant or constant amplitude in the frequency domain: Provides uniform sounding of the transmission channel and thus improves the accuracy that can be achieved by the channel estimator in the receiver.

To remove identity ambiguity between the network stations, a sufficiently large set of cell IDs is required, and thus a similarly large number of different preamble symbols must be available. The selection of which basestation will serve a terminal is based on the preamble and the IDs must be distinct for this process to be effective. If IDs are reused geographically too close together then interference will occur, and this will degrade system performance. As indicated above, the preamble symbol is also used for initial synchronisation (time and frequency) and received signal power measurements.

It is now increasingly common for different classes of basestations to exist within a network. For example, these include as macro cell-, pico cell-, femto cell- and relay-stations. The different classes of basestation have different geographical areas within which their transmissions can be received by a subscribe station ("coverage areas"). The smaller coverage-area network stations are often provided to fill in coverage "holes" or expand coverage of the macrocell base station. Current solutions only offer sufficient Cell ID sets to discriminate between macro-basestation cells. For example, the IEEE 802.16e system (Mobile WiMax) provides 114 distinct sequences. However, with more than 30 femtocells now sometimes being provided per macrocell this number of unique IDs is becoming insufficient to guarantee that adjacent transmitters do not reuse the same IDs.

The simple solution of increasing the number of IDs for use in the preamble would produce very large sets of sequences, requiring a large search memory stored in the subscriber stations ID to identity each network station; this increases terminal complexity and acquisition time.

With the advent of more complex relay stations, additional preamble-type sequences have been proposed for use by the relay station (RS). European patent application EP 07113554.5 discloses a frame structure in which a window for transmitting a relay station identifier is situated at around the middle of a downlink subframe. This disclosure indicates that the relay station identifier, referred to as a relayamble, should not be confused with a normal preamble sequence, so it is not transmitted at the same time as preamble transmission of the macro basestation (BS) preamble. The disclosure aims to overcome the disadvantage that synchronisation between the RS and BS is difficult if they both transmit their own synchronisation signal during the preamble, because the RS cannot receive the BS preamble from synchronisation purposes at the same time as transmitting a preamble itself. Thus the relayamble is situated later in the downlink subframe to allow the RS to first receive the preamble from the BS and then transmit its own identifier.

This prior art does not solve the issue of the development of pico and femto cell technology and the steadily increasing number of ID sequences required.

The invention aims to overcome or at least mitigate some of the disadvantages in the prior art.

According to one embodiment of a first aspect of the present invention there is provided a wireless communication system allowing transmission of identifiers of network stations, the system including: a first network station with an identifier and a first transmission coverage area; a second network station with an identifier and a second transmission coverage area, which is larger than and overlaps with the first transmission coverage area; and storage means storing a unit of time defined in the system, along with a first ID window defined within the unit of time allocated to the first network station for transmission of its own identifier and a subsequent second ID window defined within the unit of time allocated for transmission of the second network station identifier.

According to this embodiment, a first network station (for example a femto cell basestation) is operating adjacent to a second network station (for example a basestation for a macrocell). The system stores a unit of time defined in the system with a first ID window for the first network station and a second (later) ID window for the second network station. Such a structure allows the smaller coverage area network station to transmit its ID before the ID of the second, larger network station is transmitted.

There are a number of advantages of this embodiment. Firstly, having separate ID windows defined for the first network station to transmit identifiers for the different network stations can allow a reduction in the search time required in the subscriber stations because the subscriber station need only look for the first network station identifier in the first window.

Secondly, when a subscriber station is within reach of a smaller coverage area network station and a larger coverage area network station, the smaller coverage area network station will almost certainly be the station with which the subscriber station will communicate. This is because the smaller coverage area cells are set-up to fill in network "holes" and expand network coverage. There is thus an advantage in obtaining the cell ID of the smaller coverage area station at the beginning of the frame so that call set-up time can be reduced.

Moreover, the cell ID reveals the permutation type of the transmitter, that is, the order in which the data symbols map onto the different subscribers. The permutation used is different between cells to improve interference tolerance. In many systems, such as the 16e system (mobile WiMax), the permutation used is derived from the cell ID, to save some signalling. The receiver uses the cell ID numerical value in an equation to determine the permutation (mapping sequence). Therefore it can be important for the subscriber station to receive this information as soon as possible in the frame to set the relevant parameters. Surprisingly, the present inventor has found that it is possible to put the smaller coverage area network station identifier first in the frame without losing synchronisation. This may be down to synchronisation over the backhaul, increasing system accuracy or other factors.

Thirdly, if the subscriber station is outside coverage area of the second network station (and cannot receive even the preamble from this station), but within the coverage area of the first network station, transmitting the second network station cell ID (or preamble) from the first network station areas allows the subscriber station to have advance knowledge of the second network station characteristics and therefore facilitates handover.

Preferably the first or the second ID window or both ID windows are also allocated to the second network station for transmission of its own identifier. Thus, the larger coverage base station can send its own identifier in the first window at the same time as the second network station, or it can simply send its identifier in the second ID window to avoid the subscriber station receiving this identifier at the same time as the first network station identifier or it can transmit its identifier in both the first and the second ID window. The advantage of this last embodiment is that it can give diversity of transmission, so that the preamble is received reliably. Moreover, it can be used to support additional functionalities such as MIMO. By having more than one preamble symbol, some functionality can be split between the preamble symbols, not just cell ID. MIMO (multiple output multiple input) antenna systems require distinct transmissions from each antenna to characterise the channel. Using only one symbol for this places constraints on the signals used and their effectiveness. Being able to use more than one symbol (e.g. transmit from one one antenna on one symbol, but use two symbols for two antennas, etc) reduces some of these constraints.

If the second network station identifier is broadcast only in the second ID window (by both the first and second network stations) this facilitates re-use of the same sequence set for the first and second network stations, because the stations can then be most readily identified by their positions in the frame. This embodiment therefore allows the selection of a smaller number of sequences, which can be more easily searched and may be selected for other properties, such as PAPR. This is a scenario in which overlapping sequence sets can work. If the macro cell basestation transmits its cell ID at the same time as the femto cell transmitting its cell IDs they preferably should be from different (non-overlapping) sequence sets. There is, however, still the advantage that the MS will not need to search the same number of cell IDs as in the prior art in which the preambles were transmitted at the same time.

If the second network station identifier is broadcast at the same time as the first network station identifier, in the first ID window, this allows the subscriber station to collect all the information about the two network stations within range at the beginning of the frame.

Preferably the storage means stores a hierarchy of classes of network stations according to transmission coverage area and a class of the first network station is lower in the hierarchy than a class of the second network station. Thus invention embodiments can be expanded to cover more than one network station of a first class and more than one network station of a second class. In preferred embodiments, the network stations with a larger transmission coverage area are higher in the hierarchy. Classes of network station may include (from the top to the bottom of the particular hierarchy) macro cell basestations, pico cell basestations, and femto cell basestations. Relay stations are likely to be after macro cell basestations or after pico cell base stations in the structure, depending on the type of relay station. The skilled reader will appreciate that other classes can be encompassed in this hierarchy according to the transmission coverage area (area within which the subscriber station can receive transmissions).

Preferably the first ID window in the time unit is assigned to identifiers of network stations of the first network station class and the second ID window in the time unit is assigned to identifiers of network stations of the second network station class. This separation of identifiers of the different classes allows a smaller search area in the subscriber station for the identifier sequences as mentioned above, because all the sequences for the first class network stations will be present in the first ID window and not in the second ID window. The second ID window will include identifiers of network stations of the second network station class, which are transmitted either from the second network station class base stations or the first network station class base stations or both.

The unit of time defined within the system can be a frame, for example in a OFDMA system. In this case each frame can include both the first and the second ID window. As set out above, a frame normally includes a downlink subframe and an uplink subframe. The ID windows are therefore preferably included in the downlink subframe. In another embodiment, a plurality of frames is grouped together as a "superframe" and the management and synchronisation information is provided per superframe rather than per frame. For example four frames can be taken together and it would be appropriate to transmit a particular cell ID only once per superframe. Of course it is also possible to transmit a cell ID more than once per superframe.

The ID windows can be present at any positions within the unit of time, as long as they are in the defined locations. Thus they can form a "synchronisation channel" rather than a conventional preamble at the start of a unit of time. In many embodiments however, the first ID transmission window includes a first symbol or first symbols in a unit of time. Thus the first ID transmission window coincides with the start of the frame in preferred embodiments and therefore forms the preamble symbol or preamble symbols. If the unit of time is a frame, then the second ID transmission window will occur within the same frame. However, alternatively, in a superframe structure with a group of frames, the first ID window can include a first symbol or first symbols in a first downlink subframe of a unit of time and the second ID window can include a first symbol or symbols in a subsequent downlink subframe in the same unit of time. In this case both the first and the second transmission windows can provide the preamble in a downlink subframe and the management information can be spread across several frames. This gives advantages in lowering the percentage of control information per frame and can also bridge the gap between legacy frame structures and new frame structures with shorter frame lengths.

It is not necessary to limit the inventive concept to just two stations of different coverage areas or indeed to two classes of network stations with different coverage areas. The communication system may include three or more network stations of different coverage areas (or correspondingly three or more classes of network station in a hierarchy of coverage areas). Preferably therefore, one embodiment of the wireless communication system further includes a third network station with an identifier and having a larger coverage area than the second network station and the storage means additionally stores a third ID window within the unit of time, the third ID window being allocated to the first network station for transmission of the identifier of the third network station. For example, the third network station can be a macro cell basestation, the second network station can be a relay station and the first network station can be a femto cell basestation. The coverage area of the third network station may overlap with the coverage area of the first and/or the second network station. The third ID window can be in any preferred position within the unit of time. In one preferred embodiment the third ID window, belonging to the largest coverage area base station, is provided after the second ID window in the frame or group of frames.

According to an embodiment of a second aspect of the invention there is provided a method of transmitting identifiers of network stations in a wireless communication system, the system including:
  a first network station with an identifier and a first transmission coverage area; and
  a second network station with an identifier and a second transmission coverage area, which is larger than and overlaps with the first transmission coverage area,
  a unit of time being predetermined in the system along with a first and a subsequent second ID window within each unit of time allocated for transmission of network station identifiers; the method comprising
  the first network station transmitting its identifier in the first ID window of an instance of the unit of time; and
  the second network station transmitting its identifier in the first ID window and/or the second ID transmission window.

This method aspect is equivalent to the first aspect in method terms and has corresponding advantages and sub features.

According to an embodiment of a third aspect of the present invention there is provided a transmission method in a first network station of a wireless communication system, wherein the system includes:
  the first network station with an identifier and a first transmission coverage area; and
  a second network station with an identifier and a second transmission coverage area which is larger than and overlaps with the first transmission coverage area,
  a unit of time being predetermined in the system along with a first and a subsequent second ID window within each unit of time allocated for transmission of network station identifiers, the method comprising:

the first network station transmitting its identifier in the first ID window of an instance of the unit of time and then transmitting the identifier of the second network station in the second ID window of that instance of the unit of time.

This embodiment relates to the transmission method carried out in the first network station, with its smaller transmission coverage area.

The first network station transmits its own identifier in the first ID transmission window and then the identifier of this second network station in the second ID transmission window in the same unit of time. This order of transmission reduces latency in call setup because the subscriber station can acquire important signalling information from the cell ID of the first network station early in the frame, so that system latency is improved.

There are other advantages of the first network station transmitting the second network station identifier. It enhances preamble coverage of the second network station. It can also facilitate handover.

If a non-overlapping set of sequences is used to provide non-overlapping identifiers for first network stations of the first class and second network stations of a second class, this enables avoidance of some interference and confusion issues. Alternatively, however the two sequence sets can overlap, being distinguished by their positions only. This will work best if the first preamble contains the only the femto ID and the second preamble contains only the macro ID and has the advantage that the sequences can be chosen carefully for their required properties such as correlation properties and PAPR. In any case, broadcasting the identifiers of the two stations at different and preferably non-adjacent times within the frame structure facilitates the use of a smaller number of sequences to produce a sufficient number of different outcomes for today's requirements. In effect, some distinction between the sequence sets for the different network stations is required, either in time of transmission or through sequence properties, or both.

An embodiment of a third aspect of the present invention comprises a first network station of a wireless communication system, wherein the system includes:
  the first network station with an identifier and a first transmission coverage area; and
  a second network station with an identifier and a second transmission coverage area which is larger than and overlaps with the first transmission coverage area,
  a unit of time being predetermined in the system along with a first and a subsequent second ID window within each unit of time allocated for transmission of network station identifiers, the first network station comprising:
  control means and transmission means arranged to transmit its identifier in the first ID window of an instance of the unit of time and to transmit the identifier of the second network station in the subsequent second ID window of that instance of the unit of time.

This perspective of the present invention relates to a first network station which operates to carry out the method of the first network station in use. The aspect and its method counterpart can be combined with all the features of the other aspects.

According to an embodiment of the fourth aspect of the present invention there is provided a method in a subscriber station for receiving network station identification in a wireless communication system, wherein the system includes: the subscriber station, a first network station with an identifier; and a second network station with an identifier; the first network station belonging to a first class of network stations, and the second network station belonging to a second class of network stations having a larger transmission coverage are than a transmission coverage area of the first class of network stations, a unit of time being predetermined in the system along with at least a first ID window within the unit of time allocated for transmission of network station identifiers of the first class and a subsequent second ID window within the unit of time allocated for transmission of network station identifiers of the second class, the method comprising:
  the subscriber station receiving transmission of the first network station identifier in the first ID window of an instance of the unit of time and then receiving transmission of a second network station identifier in the second ID window of that instance of the unit of time;
  the subscriber station searching a list of stored identifiers for the first class to identify the first network station; and
  the subscriber station searching a list of stored identifiers for the second class to identify the second network station.

This aspect relates to the subscriber station (sometimes referred to as a mobile station) and highlights the advantages of the present invention. Since there can be a separate list of identifiers for a first class of network station and a second class of network station, storage space within the mobile station is reduced and set up time is minimized. Moreover, and as explained above, the network station which will be active in communicating with the subscriber station is the first network station and therefore it is advantageous for the cell ID for the first network station to be acquired early in the frame and at least before the second network station.

Features of this aspect can be combined with features of any of the other aspects as desired.

An embodiment of the fifth aspect of the present invention provides a subscriber station in a wireless communication system, wherein the system includes: the subscriber station, a first network station with an identifier; and a second network station with an identifier; the first network station belonging to a first class of network stations, and the second network station belonging to a second class of network stations having a larger transmission coverage are than a transmission coverage area of the first class of network stations, a unit of time being predetermined in the system along with at least a first ID window within the unit of time allocated for transmission of network station identifiers of the first class and a subsequent second ID window within the unit of time allocated for transmission of network station identifiers of the second class, the subscriber station comprising:
  reception means arranged to receive transmission of the first network station identifier in the first ID transmission window of an instance of the unit of time and to receive transmission of a second network station identifier in the second ID window of that instance of the unit of time;
  data storage means arranged to store a list of stored identifiers for the first class and a different list of stored identifiers for the second class;
  searching means (such as correlation circuit) arranged to search the lists of stored identifiers.

The subscriber station comprises the functionality necessary to carry out the method steps required in a mobile station.

Preferably, the mobile station also includes processing means operable to determine a transmission permutation of the first network station from the identifier of the first network station. Thus the method in the mobile station can include determining a transmission permutation of the first network station.

According to a further aspect of the present invention, there is provided software which, when executed on a computing device of a wireless communication system, carries out the method as described above and/or which, when downloaded onto a station of a wireless communication system causes it to become the station as detailed above.

Embodiments of the present invention allow improvements to a wireless communication system when there are two network stations, one with a larger coverage area and one with a smaller coverage area. This concept extends to the idea of classes of network station in a hierarchy. In the embodiments, network stations with a first, smaller transmission coverage area transmit their cell ID in the frame or superframe before the ID's of network stations with a coverage area which is larger than the first transmission coverage area. In this way, not only can the absolute number of identifiers required in a geographical area potentially be reduced, but handover can be facilitated and latency can be reduced.

Preferred features of the present invention will now be described, purely by way of example, with reference to the accompanying drawings, in which.

FIG. 1, which is described hereinbefore, is a prior art frame structure shown in some detail. This frame structure is suitable for single-hop transmission and a preamble of each frame is shown in the downlink subframe occupying one full symbol and containing the cell ID for the basestation.

Figure 2:
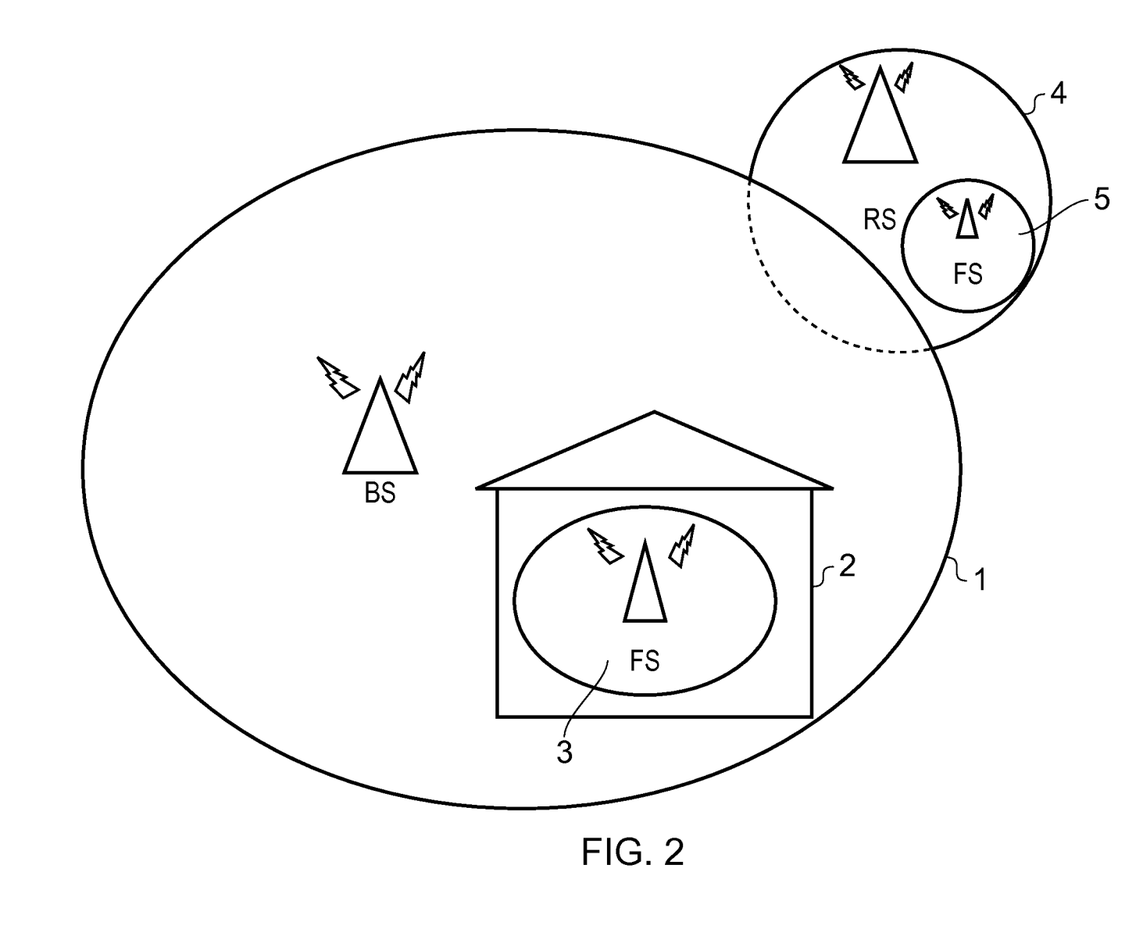
FIG. 2 shows the geographical coverage of a basestation, a relay station and two femto cell stations.

FIG. 2 is a schematic diagram illustrating a more complex situation in which there is a basestation BS serving a macro cell 1. The building shown as 2 within the macro cell denotes a coverage hole which is filled by a femto cell whose area is shown by circle 3 around a femto cell transmitter FS. A relay station RS provides extension of the coverage of the base station by area 4. Area 5 indicates a coverage hole within the relay station coverage which is then filled by another femto cell basestation FS.

The situation shown in FIG. 2 is just one example of a scenario in which the number of cell IDs required to identify the various network stations is high. It will be necessary for a subscriber moving between area 1 and area 4 for example to be able to distinguish between the macro basestation BS, the femto cell basesation FS, the relay cell station RS and the additional femto cell station FS within the relay area.

Embodiments of the invention split the cell ID signalling over 2 or more preamble symbols by using a first ID window for the smaller coverage area network station and a subsequent second ID window for any larger coverage area network station. This can significantly reduce the search space in the MS while providing the opportunity to distinguish between a large number of different network entities.

The example shown in FIG. 2 has 3 types of network stations, a macro cell basestation, a relay basestation and a femto cell basestation, but similar issues arise when there are 2 or more than 3 types of network stations. To provide identifiers for all these network stations in a single preamble would increase the memory required in the MS and number of cell IDs required in direct proportion to the increase in the number of network entities. Thus, according to preferred embodiments, it is proposed to use at least 2 preamble symbols (the example here will primarily be limited to 2 symbols for simplicity) $P_1$ & $P_2$. A number of sequence sets are also employed, where each corresponds to a basestation class (such as macrocell, relay, femto, $C_M$, $C_R$ & $C_F$ respectively) each with a set size appropriate to the class (e.g. we denote the sizes as $S_M$, $S_R$ & $S_F$ respectively for this example). It is possible to place the 2 preamble symbols together. Alternatively, they can be spaced further apart to match the frame structure requirements. For example, only one preamble symbol per frame may be allowed, and a group of frames (which together comprise a superframe) together transit all the preamble component symbols.

The basic concept of this embodiment is now described. If each preamble symbol ($P_1$, $P_2$) transmits a distinct sequence set with generic set size of $S_1$ & $S_2$ then the total number of distinct IDs is equal to $S_1 * S_2$, but the search space is only $S_1 + S_2$. With a single preamble symbol, the search space would have to be $S_1 * S_2$, for $S_1 * S_2$ distinct cell IDs.

The concept can be extended to include more preamble symbols, each with a distinct preamble set, $S_1 \ldots S_N$. Thus the total set size is $$\prod_{i=1}^{N} S_i,$$

but the number of searches across all symbols can be only $$\sum_{i=1}^{N} S_i.$$

In a cellular system, there is a hierarchy of basestations, so within a macrocell there will be a number of femtocells. The femtocells do not provide continuous coverage and on leaving a femtocell the terminal will handover to the local macrocell. Knowing the local macrocell ID from the femtocell preamble would simplify handover. To enable discrimination between the basestation type, and therefore assist in handover, it is advantageous to transit a sequence from more than one of the sequence sets. Taking the macro/femto deployment as an example, one symbol ($P_1$) could transmit a sequence from sets $C_M$ or $C_F$. In either case, the second preamble symbol ($P_2$) is used to transmit the macrocell sequence. Since all sites within the same macrocell transmit the same symbol on $P_2$, diversity is provided and acquisition coverage is improved. That is, if all transmitters within the coverage area of the macrocell BS transmit its cell ID, a receiver will combine all of these transmissions to provide a stronger combined signal.

Figure 3:
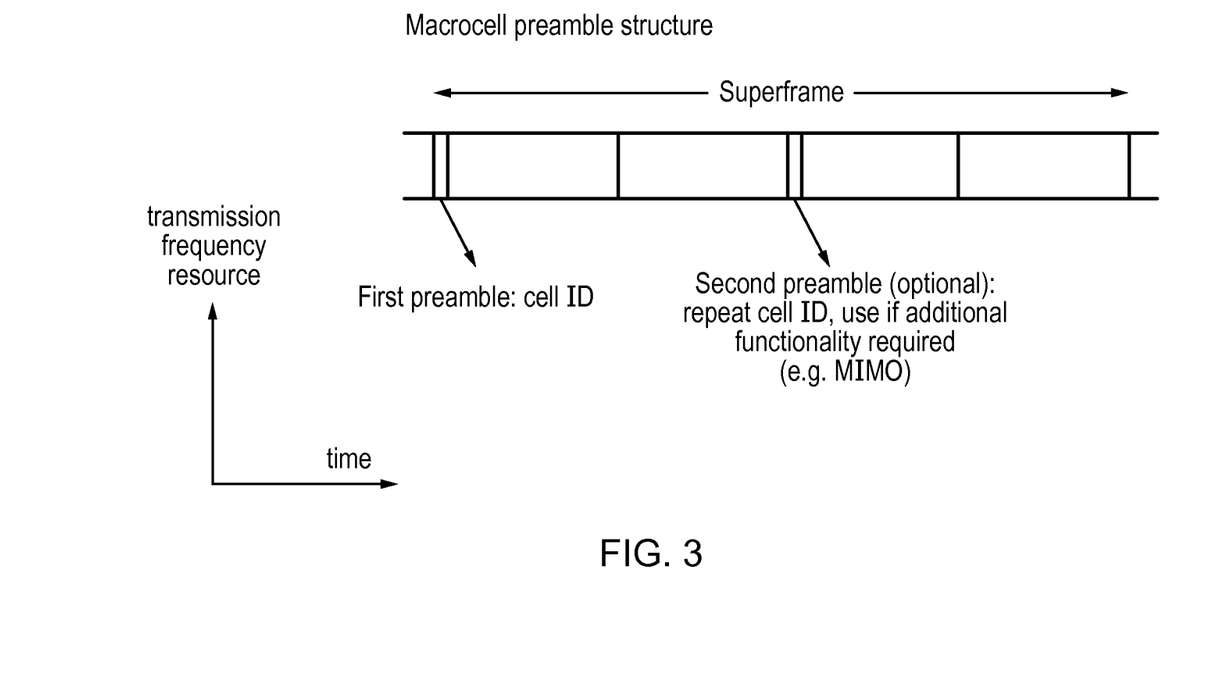
FIG. 3 shows the transmission of identifiers from a first network station according to a first embodiment.

FIG. 3 shows one possible implementation of the ideas underlying this invention. Here a frame structure is shown with time (symbols) along the x axis and frequency (subchannels) along the y axis. In this Figure, the transmissions from the macro cell basestation are shown. The basestation transmits its own cell ID in the preamble of a first frame and in the second frame of a superframe it transmits its own cell ID again or some other useful control signal.

Figure 4:
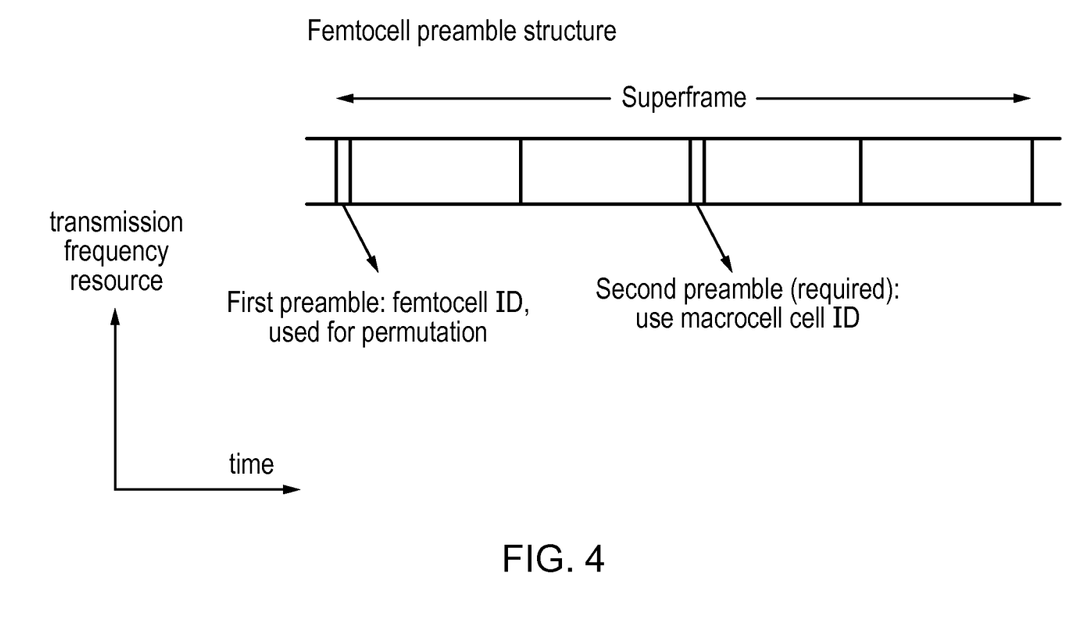
FIG. 4 shows the transmission of identifiers from a second network station according to a first embodiment.

The corresponding femto cell preamble structure is shown in FIG. 4. The femto cell transmits its own ID in the first preamble of the superframe and the macro cell cell ID in the second preamble of the superframe.

In an alternative frame structure to that shown in FIGS. 3 and 4, if the macro cell does not transmit its own ID in the first preamble, then it will be possible to use identical sequence sets for the macro cell basestation (without additionally making sure that the femto cell is not allocated the ID of its macrocell) and femto cell basestation and distinguish between the basestations by means of the position only of the cell IDs within the superframe structure. It is worth noting as an aside that some set-up signalling can be used to indicate to the MS where to expect the preambles from the different types of basestation.

To summarise the structure in FIGS. 3 and 4:
For the Macrocell Basestation:
The first preamble determines cell ID.
The second preamble is not strictly required but if present it repeats the cell ID to save complexity (no search required).
The number of cell IDs for the macro cell is limited by the number of IDs on a single preamble from set $C_M$.
For Femto BS:
The first preamble is used to determine the femto cell BS ID
The second preamble is usually required, and to assist handover this is the same as the local macro BS In this case, there are $S_M$ macro IDs, and $S_F$ femto BS IDs per macro, so $S_M * S_F$ total sequences. If the 2 sequence sets $(S_F, S_M)$ are the same, then the case where the femtocell secondary preamble is the same as the macro preamble must be avoided. There might also be interference from a femtocell preamble into an adjacent cell. Having distinct sequence sets would remove the issue, and this is recommended.

During acquisition, both sets need to be searched ($S_M + S_F$ combinations), but this is still better than having to search all the combinations during the first preamble ($S_M * S_F$).

The concept can be extended to include more preamble symbols (such as for relay stations), each with a distinct preamble set, $S_1 \ldots S_N$. Thus the total set size is $$\prod_{i=1}^{N} S_i,$$

but the number of searches on the first symbol is only $$\sum_{i=1}^{N} S_i.$$

Figure 5:
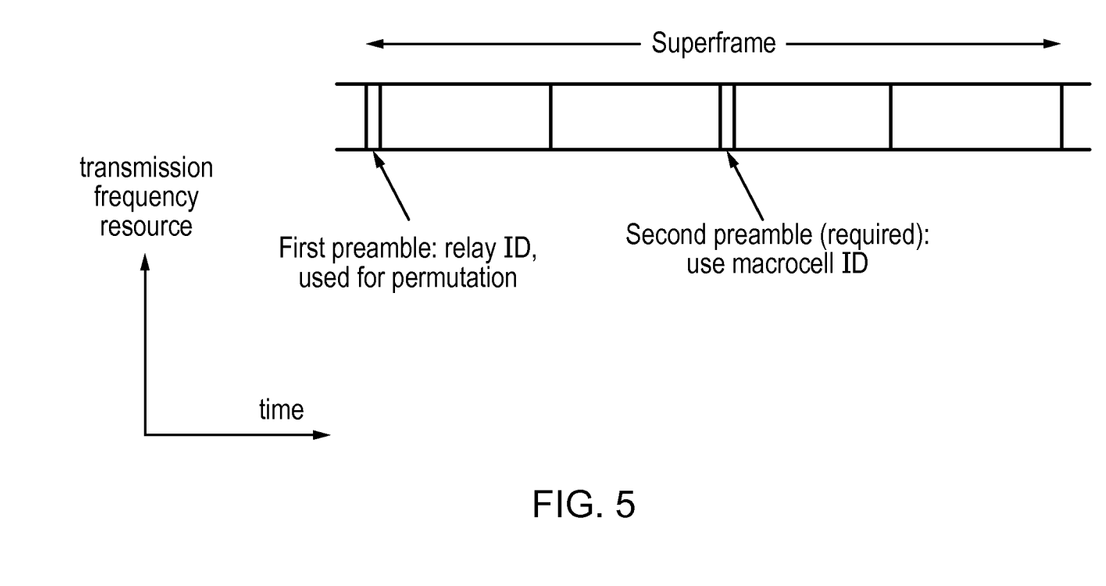
FIG. 5 shows the transmission of identifiers from a first network station according to a second embodiment.

For example with a relay station within a macrocell the structure could be as shown in FIG. 5, which shows the preamble signalling carried out by the relay station. The skilled reader will appreciate that the signalling carried out by the macrocell BS will correspond to FIG. 4.

Figure 6:
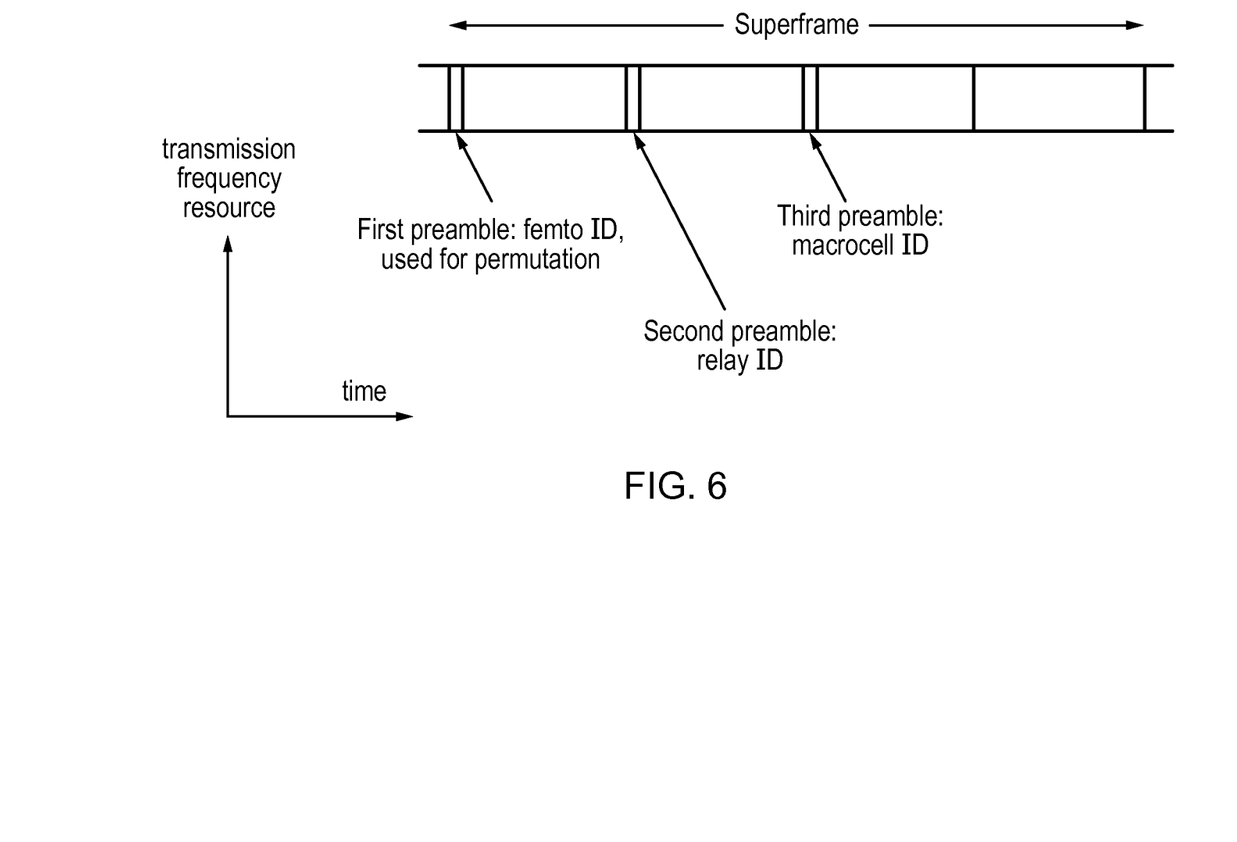
FIG. 6 shows the transmission of identifiers from a first network station according to a third embodiment.

With a macrocell, relay and femtocell all present the structure could then be as shown in FIG. 6 for the femto cell basestation. Here, the relay station could use the first two preambles to transmit its own ID and the last preamble for the macrocell BS ID and the macrocell BS could transmit its cell ID in all 3 preambles. Other signalling patterns could be used in different situations.

Using the first symbol for the active transmitter to denote the signalling information, such as permutation, reduces system latency. If higher latency can be tolerated, than other ordering of the symbols is possible.

If there are distinct sequence sets, the acquisition procedure in, for example an MS, for a macrocell/femto deployment, for example, is:
Search to find $P_1$ (the first preamble) symbol over $S_F$ and $S_M$ sequence sets to identify $S_1$ (search size is $S_M + S_F$)
If in $S_M$, this is macrocell
Search rest of preamble positions, with $S_1$ sequence for additional preambles if in use
If in $S_F$, this is femto
Search rest of preamble positions, over $S_M$ sequences for macrocell ID The primary benefit of invention embodiments is the expansion of the number of network stations that can be identified without a proportional increase in complexity.

As mentioned previously, important properties for the preamble symbols are the correlation properties and the peak to average power ratio (PAPR). The autocorrelation properties determine the probability of detecting the preamble symbol and the accuracy of synchronisation (time and frequency). Crosscorrelation determines the likelihood of correctly determining the preamble sequence. As the set size becomes large, less optimal sequences have to be chosen and so performance degrades. Having smaller component sequence sets allows more optimal sequence sets to be chosen.

In deployments with different basestation types, where they all transmit the same preamble symbol, corresponding to the local macrocell ID, preamble coverage is enhanced by use of diversity.

In summary, embodiments of this invention:
Enable large ID sets with smaller search space than a single symbol
Allow signal properties to be better optimized, such as correlation properties or PAPR
Improve the efficiency of handover processes by identifying the type of basestation without the terminal needing to read any control information.
Improve preamble coverage In any of the above aspects, the various features may be implemented in hardware, or as software modules running on one or more processors. Features of one aspect may be applied to any of the other aspects.

The invention also provides a computer program or a computer program product for carrying out any of the methods described herein, and a computer readable medium having stored thereon a program for carrying out any of the methods described herein. A computer program embodying the invention may be stored on a computer-readable medium, or it could, for example, be in the form of a signal such as a downloadable data signal provided from an Internet website, or it could be in any other form.

The invention claimed is:
1. A wireless communication system allowing transmission of identifiers of network stations, the wireless communication system including:
a first network station with a preamble acting as an identifier of the first network station and a first transmission coverage area;
a second network station with a preamble acting as an identifier of the second network station and a second transmission coverage area, which is larger than and overlaps with the first transmission coverage area; and
memory storing a unit of time defined in the wireless communication system, along with a first ID window defined within the unit of time allocated to the first network station for transmission of the identifier of the first network station and a subsequent second ID window defined within the unit of time allocated for transmission of the second network station identifier, wherein the first network station is operable to transmit the identifier of the first network station in the first ID window and to transmit the identifier of the second network station in the second ID window.

2. The wireless communication system according to claim 1, wherein the first ID window is also allocated to the second network station for transmission of the identifier of the second network station.

3. The wireless communication system according to claim 1, wherein the second ID window is also allocated to the second network station for transmission of the identifier of the second network station.

4. The wireless communication system according to claim 1, wherein the memory stores a hierarchy of classes of network stations according to transmission coverage area and a class of the first network station is lower in the hierarchy than a class of the second network station.

5. The wireless communication system according to claim 4, wherein the first ID window in the time unit is assigned to identities of network stations of the first network station class and the second ID window in the time unit is assigned to identities of network stations of the second network station class.

6. The wireless communication system according to claim 1, wherein the unit of time is a frame in an OFDMA system or a group of frames in an OFDMA system.

7. The wireless communication system according to claim 1, wherein the first ID window includes a first symbol or first symbols in a unit of time.

8. The wireless communication system according to claim 7, wherein the first ID window includes a first symbol or first symbols in a first downlink subframe of a unit of time and second ID window includes a first symbol or symbols in a subsequent downlink subframe in the same unit of time.

9. The wireless communication system according to claim 1, wherein the wireless communication system further includes:

a third network station with an identifier of the third network station and having a larger coverage area than the second network station and wherein the memory additionally stores a third ID window within the unit of time allocated to the first network station for transmission of the identifier of the third network station.

10. A method of transmitting identifiers of network stations, the method comprising:

transmitting, by a first network station with a preamble acting as an identifier of the first network station and a first transmission coverage area, the identifier of the first network station in an allocated first ID window of an instance of the unit of time;

transmitting, by a second network station with a preamble acting as an identifier of the second network station and a second transmission coverage area, which is larger than and overlaps with the first transmission coverage area, the identifier of the second network station in the allocated first ID window and/or an allocated second ID window subsequent to the first ID window within the instance of a unit of time; and transmitting, by the first network station, the identifier of the second network station in the second ID window.

11. A transmission method, the transmission method comprising:

transmitting, by a first network station with a preamble acting as an identifier of the first network station and a first transmission coverage area, the identifier of the first network station in a first allocated ID window of an instance of a unit of time, which is allocated to the first network station for transmission of the identifier of the first network station, and then transmitting an identifier of a second network station, with a preamble acting as the identifier of the second network station and a second transmission coverage area, which is larger than and overlaps with the first transmission coverage area, in a second allocated ID window of that instance of the unit of time, which is subsequent to the first allocated ID window and is allocated for transmission of the identifier of the second network station.

12. A first network station comprising:

a controller and transmitter arranged to transmit an identifier of the first network station and a first transmission coverage area with a preamble acting as the identifier of the first network station in a first allocated ID window of an instance of a unit of time, wherein the first ID window is allocated to the first network station for transmission of the identifier of the first network station, and to transmit an identifier of a second network station, with a preamble acting as the identifier of the second network station and a second transmission coverage area, which is larger than and overlaps with the first transmission coverage area, in a second allocated ID window of that instance of the unit of time, wherein the second allocated ID window is allocated for transmission of the identifier of the second network station.

13. A method comprising:

receiving, by a subscriber station, transmission of an identifier of a first network station, with a preamble acting as the identifier of the first network station, in a first ID window within an instance of a unit of time allocated to the first network station for transmission of network station identifiers of a first class of network stations, wherein the first network station belongs to the first class of network stations, and then receiving transmission of an identifier of a second network station in a second ID window of that instance of the unit of time allocated for transmission of network station identifiers of a second class of network stations having a larger transmission coverage area than a transmission coverage area of the first class of network stations;

determining, by the subscriber station, a class of each network station based on the first and second ID windows in which each identifier is received;

storing, by the subscriber station, a list of identifiers for the first class and a different list of identifiers for the second class;

searching, by the subscriber station, a list of stored identifiers for the first class to identify the first network station; and searching, by the subscriber station, a list of stored identifiers for the second class to identify the second network station.

14. A subscriber station comprising:

a receiver arranged to receive transmission of an identifier of a first network station, with a preamble acting as the identifier of the first network station, in a first ID transmission window of an instance of a unit of time, wherein the first network station belongs to a first class of network stations and the first ID transmission window is allocated to the first network station for transmission of identifiers of the first class of network stations, and to receive transmission of an identifier of a second network station, with a preamble acting as the identifier of the second network station, in a subsequent second ID transmission window of that instance of the unit of time wherein the second network station belongs to a second class of network stations having a larger transmission coverage area than a transmission coverage area of the first class of network stations and the subsequent second ID transmission window is allocated for transmission of identifiers of the second class of network stations;

a determination unit to determine a class of each network station based on the first and second ID transmission windows in which each identifier is received;

a data storage unit arranged to store a list of stored identifiers for the first class and a different list of stored identifiers for the second class; and a searching unit arranged to search the lists of stored identifiers.

15. The subscriber station according to claim 14, further including processing means operable to determine a transmission permutation of the first network station from the identifier of the first network station.

16. A computer program embodied on a non-transitory computer readable medium which, when the computer program is executed on a first network station of a wireless communication system, carries out a transmission method, the transmission method comprising:

transmitting, by a first network station with a preamble acting as an identifier of the first network station and a first transmission coverage area, the identifier of the first network station in a first allocated ID window of an instance of a unit of time, wherein the first ID window is allocated to the first network station for transmission of the identifier of the first network station, and then transmitting, a subsequent second allocated ID window of that instance of the unit of time, an identifier of a second network station, with a preamble acting as the identifier of the second network station and a second transmission coverage area which is larger than and overlaps with the first transmission coverage area, wherein the second allocated ID window is allocated for transmission of the identifier of the second network station.

17. A computer program embodied on a non-transitory computer readable medium which, when the computer program is executed on a subscriber station, carries out a method in the subscriber station for receiving network station identification in a wireless communication system, the method comprising:

receiving, by the subscriber station, transmission of an identifier of a first network station, with a preamble acting as the identifier of the first network station, in a first ID window of an instance of a unit of time, wherein the first ID window within the unit of time is allocated to the first network station for transmission of network station identifiers of a first class of network stations, wherein the first network station belongs to the first class of network stations, and then receiving transmission of an identifier of a second network station, with a preamble acting as the identifier of the second network station, in a subsequent second ID window within that instance of the unit of time allocated for transmission of network station identifiers of a second class of network stations, wherein the second network station belongs to the second class of network stations having a larger transmission coverage area than a transmission coverage area of the first class of network stations;

determining, by the subscriber station, a class of each network station based on the first and second ID windows in which each identifier is received;

storing, by the subscriber station, a list of identifiers for the first class and a different list of identifiers for the second class;

searching, by the subscriber station, a list of stored identifiers for the first class to identify the first network station; and searching, by the subscriber station, a list of stored identifiers for the second class to identify the second network station.

* * * * *